(12) United States Patent
Ameloot et al.

(10) Patent No.: US 11,543,098 B1
(45) Date of Patent: Jan. 3, 2023

(54) LIGHTING DEVICE FOR THE COMPLETE AND PRECISE PROJECTION OF A LIGHT BEAM AND A METHOD FOR ITS USE

(71) Applicant: Delta Light NV, Wevelgem (BE)

(72) Inventors: Peter Ameloot, Wevelgem (BE); Paula Catalina Acuña Roncancio, Wevelgem (BE); Dean Skira, Wevelgem (BE)

(73) Assignee: DELTA LIGHT NV, Wevelgem (BE)

( * ) Notice: Subject to any disclaimer, the term of this patent is extended or adjusted under 35 U.S.C. 154(b) by 0 days.

(21) Appl. No.: 17/590,354

(22) Filed: Feb. 1, 2022

(51) Int. Cl.
| | |
|---|---|
| F21V 5/00 | (2018.01) |
| G02B 27/30 | (2006.01) |
| F21V 5/04 | (2006.01) |
| F21V 11/08 | (2006.01) |
| F21V 23/04 | (2006.01) |
| F21V 9/40 | (2018.01) |
| F21V 14/02 | (2006.01) |
| F21V 29/70 | (2015.01) |
| F21Y 115/10 | (2016.01) |
| F21Y 113/13 | (2016.01) |
| F21W 131/107 | (2006.01) |

(52) U.S. Cl.
CPC .............. *F21V 5/008* (2013.01); *F21V 5/045* (2013.01); *F21V 5/048* (2013.01); *F21V 9/40* (2018.02); *F21V 11/08* (2013.01); *F21V 14/02* (2013.01); *F21V 23/0435* (2013.01); *G02B 27/30* (2013.01); *F21V 29/70* (2015.01); *F21W 2131/107* (2013.01); *F21Y 2113/13* (2016.08); *F21Y 2115/10* (2016.08)

(58) Field of Classification Search
CPC .......... F21V 5/008; F21V 5/045; F21V 5/048; F21V 9/40; F21V 11/08; F21V 14/02; F21V 23/0435; G02B 27/30
See application file for complete search history.

(56) References Cited

U.S. PATENT DOCUMENTS

| | | | | |
|---|---|---|---|---|
| 5,619,376 A | * | 4/1997 | Kudo | G03F 7/701 362/268 |
| 6,324,013 B1 | * | 11/2001 | Nakai | G02B 27/4227 359/793 |
| 2010/0027251 A1 | * | 2/2010 | Shpizel | F21L 4/00 362/187 |
| 2016/0085079 A1 | * | 3/2016 | Gerlitz | G02B 13/146 359/356 |
| 2019/0235372 A1 | * | 8/2019 | Yamamoto | G03B 21/2013 |
| 2019/0243115 A1 | * | 8/2019 | Hara | G02B 21/02 |
| 2020/0331097 A1 | * | 10/2020 | Petring | G02B 19/0047 |
| 2021/0096360 A1 | * | 4/2021 | Seppala | G02B 5/005 |
| 2021/0405362 A1 | * | 12/2021 | Shi | G02B 27/0101 |

FOREIGN PATENT DOCUMENTS

WO   2009040822 A2   4/2009

\* cited by examiner

*Primary Examiner* — Bryon T Gyllstrom

(74) *Attorney, Agent, or Firm* — Vorys, Safer, Seymour and Pease LLP

(57) ABSTRACT

The present invention relates to a lighting device for the complete and precise projection of a light beam comprising a light source, a plate and a light focusing system, the plate comprising an aperture, the light source and the light focusing system being on a first side of the plate, the light source and the light focusing system being configured for projection of a light beam from the aperture, the light focusing system comprising a collimator, two biconvex and one biconcave lenses. The invention also relates to a method for completely and precisely illuminating an object or space through an aperture.

16 Claims, 3 Drawing Sheets

LIGHTING DEVICE FOR THE COMPLETE AND PRECISE PROJECTION OF A LIGHT BEAM AND A METHOD FOR ITS USE

TECHNICAL FIELD

The invention relates to a lighting device for the complete and precise projection of a light beam.

In a second aspect, the invention also relates to a method for completely and precisely illuminating an object or space through an aperture.

In a third aspect, the invention also relates to a method according to the second aspect, performed with a lighting device according to the first aspect.

In a fourth aspect, the invention relates to the use of a lighting device according to the first aspect or a method according to the second aspect for architectural lighting.

PRIOR ART

Such a device is known, for example, from HR P20180085.

HR '085 describes a lamp assembly that allows emitting a light beam and projecting it accurately and completely through an opening in a partition. The partition completely hides the lamp assembly from an illuminated space on an opposite side of the partition. The lamp assembly allows a full use and projection of the light emitted by a light source into the illuminated space, without any optical element having the function of producing, directing or shaping the light in the illuminated space.

This known device has the following drawbacks or problems.

A lamp assembly according to HR '085 uses a first lens to receive the light emitted from the light source. That light is projected by the first lens as a parallel beam onto a second lens. For example, a biconvex lens is used as the first lens. Some of the light emitted from the light source is reflected on the first lens. This light never reaches the aperture. A substantial part of the light is emitted by the light source next to the first lens, as a result of which this light is lost in the inside of the lamp system. Yet another portion of the light is projected by the first lens, not onto the second lens, but onto the inside of the lamp assembly. This light also does not reach the aperture and causes additional losses. In addition, the refractive index of the lenses is non-homogeneous, resulting in chromatic aberration.

According to an embodiment described in HR '085, the first lens is movable so as to change the angle of the light beam projected from the aperture. The light source is no longer necessarily positioned in the focal point of the first lens, so that a parallel light beam is not obtained on the second lens and more light is lost in the lamp assembly. Additionally, depending on the position, more light on the first lens is reflected to the light source and more light is emitted from the light source next to the first lens.

WO 2009/040822 describes a micro projector.

US 2019/2431115 discloses an information acquisition device.

The present invention aims to solve at least some of the above problems or drawbacks.

SUMMARY OF THE INVENTION

In a first aspect, the present invention relates to a lighting device according to claim 1.

The great advantage of a lighting device according to the present invention is that internal losses in the lighting device are kept to a minimum, so that a greater light output can be obtained for the same power of the light source. The lighting device comprises a light source, a plate with aperture, and a light focusing system, comprising a collimator, at least two biconvex, and at least one biconcave lens. The collimator is suitable for forming a parallel light beam from light emitted by the light source. The collimator does not reflect light to the light source, so that a first source of losses is eliminated. The parallel light beam is projected onto a first biconvex lens. The diameter of this lens is at least equal to the diameter of the collimator, so that all light from the collimator is projected onto the first biconvex lens and no light is lost. The first biconvex lens focuses the incident light to its focal point. The biconcave lens is placed within the focal length of the first biconvex lens. The biconcave lens diverges the light beam. Because a second biconvex lens is placed within the focal length of the biconcave lens, the diameter of the second biconvex lens being at least equal to the collimator, the diverging light beam from the biconcave lens falls almost entirely on the surface of the second biconvex lens. Internal light losses are again limited. The second biconvex lens is placed at a distance from the aperture between at least one third of the focal length of the second biconvex lens and at most the focal length of the second biconvex lens. The second biconvex lens focuses the incident light to its focal point. Because the focal point is in the vicinity of the aperture, even with an aperture with limited dimensions, only a limited portion of the light will be absorbed by the plate, so that the total internal losses are limited, and a higher light output is obtained for the same power. By judiciously positioning the biconcave lens between the first and second biconvex lens, the angular aperture of the light beam projected from the aperture can be determined. The use of a small aperture makes the origin of the light invisible to the eye.

Preferred embodiments of the device are set out in claims 2 to 9.

A particular preferred embodiment of the invention relates to a device according to claim 4.

A Fresnel lens with a microstructure is placed between the aperture and the second biconvex lens. The Fresnel lens provides additional focusing of the light to the aperture and the microstructure contributes to good colour mixing of the emitted light, preventing colour aberration.

In a second aspect, the present invention relates to a method according to claim 10. This method has the advantage, among other things, that an object or space can be illuminated in a complete and precise manner through an aperture. No light source is visible that can cause glare. Only the object or space to be illuminated is illuminated. Light losses are kept to a minimum.

Preferred embodiments of the method are described in the dependent claims 11 to 13.

In a third aspect, the invention relates to a method according to the second aspect, performed with the aid of a lighting device according to the first aspect.

In a fourth aspect, the present invention relates to a use according to claim 15. This use results in improved architectural lighting because only a space or object is illuminated, without a light source being visible that can cause glare and whereby light losses are kept to a minimum.

DETAILED DESCRIPTION OF THE INVENTION

Figure 1:
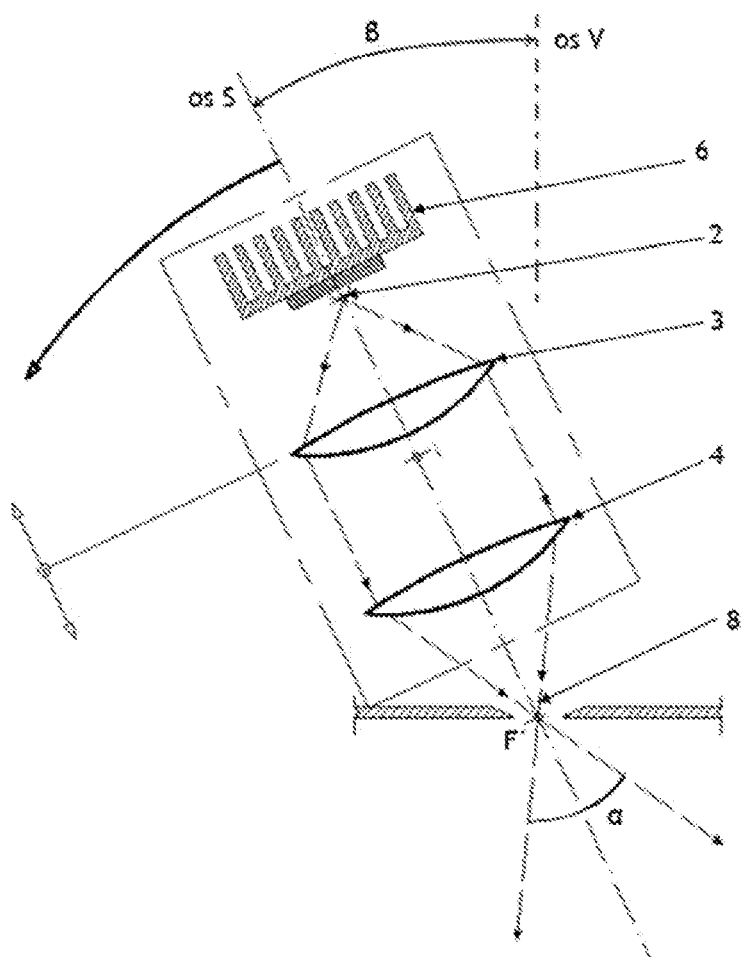
FIG. 1—Prior art shows a schematic representation of a prior art lamp assembly.

Unless otherwise defined, all terms used in the description of the invention, including technical and scientific terms, have the meaning as commonly understood by a person skilled in the art to which the invention pertains. For a better understanding of the description of the invention, the following terms are explained explicitly.

In this document, 'a' and 'the' refer to both the singular and the plural, unless the context presupposes otherwise. For example, 'a segment' means one or more segments.

The terms 'comprise', 'comprising', 'consist of', 'consisting of', 'provided with', 'include', 'including', 'contain', 'containing', are synonyms and are inclusive or open terms that indicate the presence of what follows, and which do not exclude or prevent the presence of other components, characteristics, elements, members, steps, as known from or disclosed in the prior art.

Quoting numerical intervals by endpoints comprises all integers, fractions and/or real numbers between the endpoints, these endpoints included.

In the context of this document, a 'collimator' is a total internal reflection lens configured to encapsulate a light source, couple in light emitted from the light source, and couple out by means of total reflection of the coupled in light as a substantially parallel bundle of light beams on a side opposite the light source.

By 'optical axis' of an optical element in the context of this document is meant a straight line that coincides with the axis of symmetry of the optical element. In a lens system, the optical axis of the lens system preferably coincides with the optical axes of the individual lenses.

A 'biconvex lens' in the context of this document is a lens that is convex on both sides of the lens. A biconvex lens has two focal points. A focal point of a biconvex lens is the point where incident light beams converge parallel to the optical axis after passing through the biconvex lens.

In this document, a 'biconcave lens' is a lens that is concave on both sides of the lens. A biconcave lens has two focal points. A focal point of a biconcave lens is the point where the extension of incident rays would converge parallel to the optical axis when the incident rays were incident in such a way that they form a parallel beam after passing through the lens.

The 'focal length' in this document is the distance between a focal point of a lens and the centre of the lens.

In this document, an 'aperture' is an opening for a light beam or light ray.

In a first aspect, the invention relates to a lighting device for the complete and precise projection of a light beam.

According to a preferred embodiment, the lighting device comprises a light source, a plate and a light focusing system, the plate comprising an aperture, the light source and the light focusing system being on a first side of the plate, the light source and the light focusing system being configured for projection of a light beam from the aperture, the light focusing system comprising a collimator, at least two biconvex lenses and at least one biconcave lens, wherein when viewed from the light source to the aperture, the collimator, a first biconvex lens, the biconcave lens and a second biconvex lens are placed between the light source and the aperture on an axis S, the axis S being the central optical axis of emitted light from the light source, the focal length of both the first and second biconvex lenses being greater than or equal to the distance between the first and the second biconvex lens, wherein the absolute value of the focal length of the biconcave lens is greater than or equal to the distance between the first and second biconvex lens, with the second biconvex lens placed at a distance from the aperture that is at least equal to one third and at most equal to the focal length of the second biconvex lens, the collimator having a diameter such that the collimator is configured to receive all of the light emitted from the light source and the diameter of the two biconvex lenses and the biconcave lens being at least equal to the diameter of the collimator.

The lighting device comprises a light source, a plate and a light focusing system. The light source is configured to emit light in at most half a sphere. The half-sphere is directed towards the plate. The lighting device comprises a virtual axis S. The S axis is the central optical axis of light emitted from the light source. The plate comprises an aperture. The aperture comprises a central point. The central point of the aperture is on the S axis. The light source and light focusing system are on a first side of the plate. A space or object to be illuminated lie on an opposite second side of the plate. The light source and light focusing system are configured to project a beam of light from the aperture onto an object or into a space on the second side of the plate.

The lighting device is configured for incorporating in a ceiling or wall, with the plate lying in the plane of the wall or ceiling. The plate is preferably suitable for being painted and/or plastered, so that the lighting device can be placed almost invisibly in a ceiling or wall.

The plate is made of wood, plastic, metal or another suitable material. The plate is opaque. The plate is rectangular, square, circular or other suitable shape. The plate is suitable for covering the light source and the light focusing system from the space on the second side of the plate.

The light focusing system comprises a collimator, at least two biconvex lenses, and at least one biconcave lens. The optical axes of the collimator and lenses of the light focusing system substantially converge and form the optical axis of the light focusing system. The optical axis of the light focusing system substantially converges with the axis S of the lighting device. Viewed from the light source in the direction of the aperture, the collimator, a first biconvex lens, the biconcave lens and a second biconvex lens are disposed on the axis S.

The collimator is configured to couple in light emitted by the light source and to couple out by total reflection of coupled in light as a substantially parallel bundle of light beams, the bundle of light beams being parallel to the axis S and the bundle of light beams being projected onto the first biconvex lens.

The light source is preferably encapsulated by the collimator. The collimator has a diameter such that all the light emitted from the light source is collected. The collimator is the smallest possible form factor of an optical element suitable for narrowing an angular emission pattern of a light source in which the etendue law is respected. The collimator has a diameter of at least 20 mm and at most 45 mm, preferably at least 25 mm and at most 40 mm, even more preferably at least 30 mm and at most 35 mm. Within this range, a light focusing system has limited dimensions for flush mounting in a wall or ceiling and the light focusing system has sufficient efficiency. In the context of a collimator, efficiency is the ratio of the light intensity of the out-coupled light in candela to the luminous flux of the light source in lm. The collimator has an efficiency of at least 10 cd/lm, preferably at least 12 cd/lm, even more preferably at least 14 cd/lm.

The diameter of the collimator defines a surface area of the collimator for receiving the light emitted from the light source. Said area of the collimator is at least equal to an area of the collimator illuminated by the light emitted from the light source. It is apparent to one skilled in the art that the farther the collimator is from the light source, the larger the diameter of the collimator. It is also apparent to one skilled in the art that a collimator encapsulating the light source results in a smaller diameter.

The collimator is preferably suitable for mixing colours. This is advantageous if a light source comprises different colours mixed into one colour. A collimator suitable for mixing colours is also advantageous for ensuring colour uniformity through an angle.

The collimator has a full width at half maximum (FWHM) for the angle of the light beam of at least 6° and at most 18°, preferably at least 8° and at most 16°, even more preferably at least 10° and at most 14°. The full width at half maximum is the angle of the light beam at which the light intensity has fallen to half of the maximum. At one tenth of the maximum light intensity, the collimator has an angle of the light beam of at least 13° and at most 32°, preferably at least 17° and at most 28°, and more preferably at least 21° and at most 24°. This is advantageous because it causes the substantially parallel bundle of light beams to be strongly projected onto the first biconvex lens. As a result, there are fewer internal losses because, for example, part of the light is projected next to a lens. An additional advantage is that the substantially parallel beam prevents a part of the light from impinging on the first biconvex lens at an angle greater than the critical angle and thereby reflecting it.

In one embodiment, the collimator comprises PMMA.

The first biconvex lens has a diameter at least equal to the diameter of the collimator. As a result, a substantially parallel bundle of light beams from the collimator is projected almost completely onto a convex surface of the first biconvex lens, so that there are less internal losses because, for example, part of the light is projected next to a lens. The first biconvex lens has a diameter of at least 25 mm and at most 55 mm, preferably at least 30 mm and at most 50 mm, even more preferably at least 35 mm and at most 45 mm. Preferably, the first biconvex lens has a diameter that is at least 3 mm, preferably at least 5 mm, even more preferably at least 7 mm larger than the diameter of the collimator. Within these ranges, a light focusing system has limited dimensions for flush mounting in a wall or ceiling, wherein a light beam from the collimator is projected almost completely onto a convex surface of the first biconvex lens, minimising internal losses.

The distance between the first biconvex lens and the collimator is smaller than 20 mm, preferably smaller than 15 mm, even more preferably smaller than 10 mm. This is advantageous for a light focusing system with limited dimensions for flush mounting in a wall or ceiling. This is also advantageous because a light beam that is not completely parallel is still projected almost completely onto the first biconvex lens, minimising internal losses.

A parallel beam of light from the collimator is projected through the first biconvex lens to the focal point of the first biconvex lens on the side of the second biconvex lens. The first biconvex lens is adapted for converging the substantially parallel beam of light from the collimator in the direction of the axis S. The first biconvex lens has a focal length on the side of the second biconvex lens of at most 70 mm, preferably at most 60 mm, and more preferably at most 55 mm. This is advantageous for a light focusing system of limited dimensions for flush mounting in a wall or ceiling in that the substantially parallel beam of light from the collimator is converged at the shortest possible distance from the axis S. Preferably, the first biconvex lens has two equal focal lengths. This is advantageous in manufacturing the lighting device in that no errors in the orientation of the lens are possible.

In one embodiment, the first biconvex lens has two equal focal lengths of 50 mm.

The second biconvex lens is placed at a distance from the first biconvex lens, with the focal length of both the first and second biconvex lenses being greater than or equal to the distance between the first and second biconvex lenses. The diameter of the second biconvex lens is at least equal to the diameter of the collimator. Because the second biconvex lens is placed within the focal length of the first biconvex lens, and because the second biconvex lens has a diameter at least equal to the diameter of the collimator, light from the collimator passing through the first biconvex lens, in the absence of the biconcave lens, projected onto the second biconvex lens, is projected completely onto the surface of the second biconvex lens. This is advantageous because it minimises internal losses, for example due to light absorption in the lighting device. The placement of the second biconvex lens within the focal length of the first biconvex lens is also advantageous for a light focusing system with limited dimensions for flush mounting in a wall or ceiling.

The distance between the first biconvex lens and the second biconvex lens is at least 15 mm and at most 70 mm, preferably at least 20 mm and at most 55 mm, and even more preferably at least 25 mm and at most 50 mm.

In one embodiment, the distance between the first biconvex lens and the second biconvex lens is 50 m.

A biconcave lens is placed between the first and the second biconvex lens. The biconcave lens is configured to diverge away from axis S a light beam projected through the first biconcave lens onto the second biconcave lens. When the biconcave lens is placed close to the second biconvex lens, the beam of rays is minimally diverged.

When the biconcave lens is placed close to the first biconvex lens, the beam of rays is maximally diverged.

The absolute value of the focal length of the biconcave lens on the side of the first biconvex lens and on the side of the second biconvex lens is greater than or equal to the distance between the first and the second biconvex lens. This is advantageous for a greater divergence of the beam of rays away from the axis S, while at maximum divergence only a limited portion of the beam is projected next to the second biconvex lens, minimising internal losses.

The biconcave lens has a focal length on the side of the first biconvex lens of at most −70 mm, preferably at most −60 mm, and more preferably at most −55 mm. This is advantageous for a light focusing system of limited dimensions for flush mounting in a wall or ceiling because the parallel beam of light from the collimator is maximally diverged from the axis S at the shortest possible distance. Preferably, the biconcave lens has two equal focal lengths. This is advantageous in manufacturing the lighting device in that no errors in the orientation of the lens are possible. Preferably, the absolute value of the focal length is equal to the focal length of the first and second biconvex lenses.

In one embodiment, the biconcave lens has two equal focal lengths of −50 mm.

The diameter of the biconcave lens is at least equal to the diameter of the collimator. Because the biconcave lens is placed within the focal length of the first biconvex lens and because the biconcave lens has a diameter at least equal to the diameter of the collimator, light that is projected from the collimator through the first biconvex lens onto the biconcave lens is projected completely onto the surface of the biconcave lens. This is advantageous because it minimises internal losses, for example due to light absorption in the lighting device.

The biconcave lens has a diameter of at least 25 mm and at most 55 mm, preferably at least 30 mm and at most 50 mm, even more preferably at least 35 mm and at most 45 mm. Preferably, the biconcave lens has a diameter that is at least 3 mm, preferably at least 5 mm, even more preferably at least 7 mm larger than the diameter of the collimator. Preferably, the biconcave lens has the same diameter as the first biconvex lens. Within these ranges, a light focusing system has limited dimensions for flush mounting in a wall or ceiling, wherein a light beam is projected through the first biconvex lens almost completely onto a concave surface of the biconcave lens, minimising internal losses.

The second biconvex lens is placed at a distance from the aperture at least equal to one third and at most equal to the focal length of the second biconvex lens. The second biconvex lens is configured to converge light to the axis S. The second biconvex lens is configured to project a beam of light from the aperture to, for example, an object or space on the second side of the plate. The light beam comprises an angular aperture with respect to the axis S. The angular aperture determines how fast the cone-shaped light beam spreads in space with respect to the axis S. The angular aperture is double the angle between the axis S and the shell of the cone. The angular aperture is determined by the position of the biconcave lens in the light focusing system. If the biconcave lens is placed as close as possible to the second biconvex lens, the angular aperture is minimal. If the biconcave lens is placed as close as possible to the first biconvex lens, the angular aperture is maximal. The use of a biconcave lens is advantageous for determining the angular aperture of the light beam.

The angular aperture of the light beam is at least 5° and at most 60°, preferably at least 10° and at most 55°, even more preferably at least 15° and at most 50°.

If the second biconvex lens is placed at a distance from the aperture equal to the focal length of the second biconvex lens on the side of the aperture, the light beam will be projected through the aperture regardless of the angular aperture. If the light beam is placed at a distance from the aperture smaller than the focal length of the second biconvex lens on the side of the aperture, depending on the angular aperture and the size of the aperture, part of the light beam will be internally reflected and absorbed. These are internal losses. The losses are minimal up to a distance equal to one third of the focal length of the second biconvex lens on the side of the aperture. A smaller distance than the focal length of the second biconvex lens on the side of the aperture between the second biconvex lens and the aperture is advantageous for a light focusing system of limited dimensions for flush mounting in a wall or ceiling and a limited aperture size, while the internal losses are minimised.

The second biconvex lens has a focal length on the side of the first biconvex lens of at most 70 mm, preferably at most 60 mm, and more preferably at most 55 mm. Preferably, the second biconvex lens has two equal focal lengths. This is advantageous in manufacturing the lighting device in that no errors in the orientation of the lens are possible. This is also advantageous for a light focusing system of limited dimensions for flush mounting in a wall or ceiling.

Preferably, the second biconvex lens has the same focal lengths as the first biconvex lens and the diameter of the second biconvex lens is equal to the diameter of the first biconvex lens. This is advantageous in manufacturing the lighting device in that the first biconvex lens and the second biconvex lens can be interchanged, avoiding possible mistakes in the placement of the first and second biconvex lens.

In one embodiment, the second biconvex lens has two equal focal lengths of 50 mm.

In one embodiment, the first and second biconvex lenses and the biconcave lens comprise B270 glass and UV-W76 having a refractive index of 1.53. Such lenses are advantageous because of high visible light transmission and absorption in the UV region.

In one embodiment, the light source is an LED.

An LED is advantageous due to the low power consumption compared to, for example, a halogen lamp. Preferably, the LED is an RGB LED. This makes the colour point of the light beam adjustable. Still more preferably, the LED is an RGBW LED. Due to the addition of white, the light source has a greater light intensity for the same power compared to an RGB LED.

Alternatively, the lighting device comprises a first and a second white light source, wherein the first and second white light source have a different colour point and the colour point of the lighting device is adjustable by changing the ratio of light output from the first and second white light source. The first and second white light sources are preferably LED. Preferably, the first and second white light sources are contained in a single chip package.

According to a further embodiment, the lighting device comprises a wired or wireless interface for setting the colour point of the light beam. The interface is, for example, a KNX bus, a DALI bus, a Qbus, a DMX interface or another suitable interface.

In one embodiment, the aperture in the plate is a circular opening with a diameter of at least 6 mm and at most 12 mm.

A circular opening is advantageous for projecting a cone-shaped beam of light. With an opening of at most 12 mm, the light source and the light focusing system of the lighting element are virtually invisible to a person in a space. An opening of at least 6 mm is required to limit internal losses due to absorption on the first side of the plate. Preferably, the opening is at least 7 mm and at most 11 mm, even more preferably at least 8 mm and at most 10 mm.

In one embodiment, the light focusing system comprises a Fresnel lens, comprising a colour mixing microstructure, the Fresnel lens being disposed between the second biconvex lens and the aperture on the S axis.

The Fresnel lens is a convex lens with a small thickness. The Fresnel lens is configured to converge the light beam to the axis S. The Fresnel lens is advantageous for optimising internal losses by reducing reflections on the first side of the plate. The Fresnel lens comprises a microstructure. The microstructure is preferably integrated on the surface of the Fresnel lens on the side of the aperture. The microstructure is configured for mixing light. This is advantageous to reduce chromatic aberration due to non-homogeneous refractive index of lenses.

An example of suitable microstructures is described in Oliver Dross, Kohler Integration in Color Mixing Collimators, Proc. SPIE 9571, Fourteenth International Conference on Solid State Lighting and LED-based Illumination Systems, 957109 (8 Sep. 2015); doi: 10.1117/12.2189485.

The Fresnel lens is placed at a distance of at least 11 mm from the aperture, preferably at least 13 mm, even more preferably at least 15 mm.

The Fresnel lens has a focal length of at least 11 mm, preferably at least 13 mm, even more preferably at least 15 mm.

In one embodiment, the Fresnel lens has a focal length of 16 mm and the Fresnel lens is spaced 16 mm from the aperture.

In one embodiment, the Fresnel lens comprises PMMA.

In one embodiment, the biconcave lens is movable on the axis S between the first and the second biconvex lens.

The light beam comprises an angular aperture with respect to the axis S. The angular aperture is determined by the position of the biconcave lens in the light focusing system. If the biconcave lens is placed as close as possible to the second biconvex lens, the angular aperture is minimal. If the biconcave lens is placed as close as possible to the first biconvex lens, the angular aperture is maximal. The angular aperture of the light beam can be adjusted by moving the biconcave lens. This is advantageous for flexible use of the lighting device in illuminating a part of a space or object, where the part of the space or object to be illuminated changes frequently.

The position of the biconcave lens is manually adjustable. The position of the biconcave lens is manually adjustable from the first side of the plate.

The position of the biconcave lens is preferably manually adjustable from the second side of the plate. The plate comprises on the second side means for manually adjusting the position of the biconcave lens. A non-limiting example of a means is a screw, accessible from the second side of the plate. Rotation in a first direction shifts the biconcave lens toward the first biconvex lens. Rotating in a second direction shifts the biconcave lens toward the second biconvex lens.

The position of the biconcave lens is preferably adjustable from a distance. The lighting device comprises a stepper motor and a wired or wireless interface suitable for operating the stepper motor. The interface is, for example, a KNX bus, a DALI bus, a Qbus, a DMX interface or another suitable interface. The stepper motor is configured to move the biconcave lens.

A remotely adjustable position of the biconcave lens is advantageous in that a visible means on the second side of the plate for adjusting the position of the biconcave lens is hereby superfluous.

The biconcave lens is preferably movable over a distance of at least 15 mm, preferably at least 20 mm, even more preferably at least 25 mm.

The angular aperture of the light beam is at least 5° and at most 60°, preferably at least 10° and at most 55°, even more preferably at least 15° and at most 50°.

In one embodiment, the lighting device comprises a tilt and rotation system for controlling the tilting and rotation of the axis S of the lighting device with respect to an axis V located through the aperture substantially perpendicular to the plane of the plate.

In a lighting device in which the axis S coincides with the axis V, a light beam is projected through the aperture substantially perpendicular to the plane of the plate. A lighting device comprising a tilt and rotation system is advantageous for flexible use of the lighting device in illuminating a part of a space or object, where the position of the part of the space or object to be illuminated changes frequently.

The light focusing system according to an embodiment of the present invention is advantageous because the light beam is projected through a focal point in the aperture or close to the aperture. If the light beam is projected through a focal point in the aperture, independent of the angle between the axis S and the axis V determined by the tilt and rotation system, the light beam will be projected entirely through the aperture. If the light beam is projected through a focal point close to the aperture, independently of the angle between the axis S and the axis V determined by the tilt and rotation system, the light beam will be projected through the aperture with minimal internal losses.

The tilt and rotation system is manually adjustable. The tilt and rotation system is manually adjustable from the first side of the plate.

The tilt and rotation system is preferably manually adjustable from the second side of the plate. The plate comprises on the second side means for manually adjusting the tilt and rotation system. A non-limiting example of a means is a screw, accessible from the second side of the plate. By rotating in a first direction, the axis S tilts away from the axis V. By rotating in a second direction, the axis S tilts to the axis V. Another non-limiting example of a means is an eccentric opening in the plate. Eccentric means that the opening does not coincide with the V axis. The eccentric opening preferably coincides with the position of the screw. By rotating the position of the eccentric opening, the plate and the axis S rotate with respect to the axis V.

In a further embodiment, the lighting device can be tilted by 30° with respect to the axis V and rotatable by 360°.

A lighting device which can be tilted by 30° with respect to the axis V and rotated by 360° is advantageous for flexible use of the lighting device in illuminating a part of a space or object, wherein the position of the part of the space or object to be illuminated changes frequently and the lighting device requires limited space for flush mounting in a ceiling or wall. Much of a space around the lighting device is accessible by the light beam, while the limitation to 30° tilting requires only limited space in a ceiling or wall.

In one embodiment, the tilt and rotation system can be controlled remotely.

The tilt and rotation system is remotely adjustable. The lighting device comprises a first stepper motor configured for tilting, a second stepper motor configured for rotation, and a wired or wireless interface suitable for operating the stepper motors. The interface is, for example, a KNX bus, a DALI bus, a Qbus, a DMX interface or another suitable interface.

A remotely adjustable stepper motor is advantageous in that visible means for adjusting the tilt and rotation system on the second side of the plate are hereby superfluous.

In one embodiment, the lighting device has an installation height of at most 120 mm and an installation diameter of at most 130 mm.

There is typically 150 mm of clearance in a suspended ceiling or modular ceiling. An installation height of up to 120 mm makes it possible to easily install the lighting device in a suspended or modular ceiling.

An installation diameter of up to 130 mm corresponds to typical maximum dimensions of commercially available lighting devices.

In a second aspect, the invention relates to a method for completely and precisely illuminating an object or space through an aperture.

In a preferred embodiment, the method comprises the steps of providing a lighting device comprising a light source, a plate having an aperture and a light focusing system, placing the lighting device and illuminating using a light beam, wherein the light beam is projected from the aperture, the light focusing system comprising a collimator, at least two biconvex lenses and at least one biconvex lens, wherein when viewed from the light source to the aperture, the collimator, a first biconvex lens, the biconcave lens and a second biconvex lens are placed between the light source and the aperture on an axis S, the axis S being the central optical axis of emitted light from the light source, wherein the focal length of both the first and second biconvex lens is greater than the distance between the first and second biconvex lens, wherein the absolute value of the focal length of the biconvex lens is greater than the distance between the first and second biconvex lens, wherein the second biconvex lens is placed at a distance from the aperture that is at least equal to one third and at most equal to the focal length of the second biconvex lens, wherein the collimator has a diameter such that all the light emitted from the light source is collected and wherein the diameter of the two biconvex lenses and the biconcave lens is at least equal to the diameter of the collimator.

In a first step, a lighting device is provided. The lighting device comprises a light source, a plate with aperture and a light focusing system. The light source is configured to emit light in at most half a sphere. The half-sphere is directed towards the plate. The lighting device comprises a virtual axis S. The S axis is the central optical axis of light emitted from the light source. The plate comprises an aperture. The aperture comprises a central point. The central point of the aperture is on the S axis. The light source and light focusing system are on a first side of the plate. A space or object to be illuminated lie on an opposite second side of the plate. The light source and light focusing system are configured to project a beam of light from the aperture onto an object or into a space on the second side of the plate.

The light focusing system comprises a collimator, at least two biconvex lenses, and at least one biconcave lens. The optical axes of the collimator and lenses of the light focusing system substantially converge and form the optical axis of the light focusing system. The optical axis of the light focusing system substantially converges with the axis S of the lighting device. Viewed from the light source in the direction of the aperture, the collimator, a first biconvex lens, the biconcave lens and a second biconvex lens are disposed on the axis S.

The collimator is configured to couple in light emitted by the light source and to couple out, by total reflection, coupled in light as a substantially parallel bundle of light beams. The collimator preferably encapsulates the light source. The collimator has a diameter such that all the light emitted from the light source is collected.

The first biconvex lens has a diameter at least equal to the diameter of the collimator. As a result, a parallel bundle of light beams from the collimator is projected almost completely onto a convex surface of the first biconvex lens, resulting in less internal losses. The first biconvex lens is capable of converging the parallel beam of light from the collimator in the direction of the axis S.

The second biconvex lens is placed at a distance from the first biconvex lens, with the focal length of both the first and second biconvex lenses being greater than the distance between the first and second biconvex lenses. The diameter of the second biconvex lens is at least equal to the diameter of the collimator. Because the second biconvex lens is placed within the focal length of the first biconvex lens, and because the second biconvex lens has a diameter at least equal to the diameter of the collimator, light from the collimator passing through the first biconvex lens, in the absence of the biconcave lens, is projected onto the second biconvex lens, completely onto the surface of the second biconvex lens. This is beneficial as it minimises internal losses.

A biconcave lens is placed between the first and the second biconvex lens. The biconcave lens diverges a light beam projected by the first biconcave lens onto the second biconcave lens away from the axis S. When the biconcave lens is placed close to the second biconvex lens, the beam of rays is minimally diverged. When the biconcave lens is placed close to the first biconvex lens, the beam of rays is maximally diverged.

The absolute value of the focal length of the biconcave lens on the side of the first biconvex lens and on the side of the second biconvex lens is greater than the distance between the first and the second biconvex lens. This is advantageous for greater divergence of the beam of rays away from the axis S, while at maximum divergence only a limited portion of the beam of rays is projected next to the second biconvex lens, minimising internal losses. The diameter of the biconcave lens is at least equal to the diameter of the collimator.

Because the biconcave lens is placed within the focal length of the first biconvex lens and because the biconcave lens has a diameter at least equal to the diameter of the collimator, light that is projected from the collimator through the first biconvex lens onto the biconcave lens is projected completely onto the surface of the biconcave lens. This is beneficial as it minimises internal losses.

The second biconvex lens is placed at a distance from the aperture at least equal to one third and at most equal to the focal length of the second biconvex lens. The second biconvex lens is configured to converge light to the axis S. The second biconvex lens is configured to project a beam of light from the aperture to, for example, an object or space on the second side of the plate. The light beam comprises an angular aperture with respect to the axis S. If the second biconvex lens is placed at a distance from the aperture equal to the focal length of the second biconvex lens on the side of the aperture, the light beam will be projected through the aperture regardless of the angular aperture. If the light beam is placed at a distance from the aperture smaller than the focal length of the second biconvex lens on the side of the aperture, depending on the angular aperture and the size of the aperture, part of the light beam will be internally reflected and absorbed. These are internal losses. The losses are minimal up to a distance equal to one third of the focal length of the second biconvex lens on the side of the aperture.

In a second step, the lighting device is placed. The lighting device is placed in such a way that the light beam shines from the aperture on the object or part of the space to be illuminated. The lighting device is configured for incorporating in a ceiling or wall, with the plate lying in the plane of the wall or ceiling. The plate is preferably painted and/or plastered, so that the lighting device is incorporated almost invisibly in a ceiling or wall.

The lighting device is connected to a power supply network. The power supply network provides the lighting device with the required power supply to illuminate an object or space. The supply voltage is rated 110 VAC or 230 VAC. The supply voltage is preferably a low voltage. Low voltage is advantageous for the safety of a person who comes into contact with the lighting device. The supply voltage is a direct current or an alternating current. Non-limiting examples of suitable low voltages are 12 VDC, 12 VAC, 24 VDC, 24 VAC, 48 VDC and 48 VAC.

In a third step, the power supply is switched on. The lighting device projects a beam of light from the aperture onto the object or the part of the space to be illuminated.

In one embodiment, the method comprises the additional step of directing the light beam.

The lighting device preferably comprises a tilt and rotation system for controlling the tilting and rotation of the axis S of the lighting device with respect to an axis V located through the aperture substantially perpendicular to the plane of the plate. The lighting device is preferably tiltable by 30° and rotatable by 360° with respect to the axis V.

The tilting and rotating allows to accurately direct the light beam projected from the aperture around the lighting device. This is advantageous for flexible use of the lighting device in illuminating a part of a space or object, where the position of the part of the space or object to be illuminated changes frequently.

The light focusing system projects the light beam through a focal point in the aperture or close to the aperture, minimising internal losses independently of an angle over which the lighting device is tilted or rotated.

The directing of the light beam is done manually. The directing of the light beam is preferably done manually from the second side of the plate. The plate comprises on the second side means for manually adjusting the tilt and rotation system. This is advantageous because a lighting device can be directed after installation in a wall or ceiling.

The directing of the light beam is done from a distance. The lighting device comprises a first stepper motor configured for tilting, a second stepper motor configured for rotation, and a wired or wireless interface suitable for operating the stepper motors. This is advantageous because no visible means are required on the second side of the plate to direct the light beam.

In one embodiment, the method comprises the additional step of adjusting the angular aperture of the light beam.

The angular aperture of the light beam is set by means of the position of the biconcave lens with respect to the first and second biconvex lens.

The angular aperture of the light beam is adjustable from at least 5° to at most 60°, preferably from at least 10° to at most 55°, even more preferably from at least 15° to at most 50°.

By adjusting the angular aperture, an object or part of a space can be illuminated precisely, without much stray light around the object to be illuminated or the part of the space to be illuminated.

The position of the biconcave lens is manually adjustable. The position of the biconcave lens is preferably manually adjustable from the second side of the plate. The plate comprises on the second side means for manually adjusting the position of the biconcave lens. This is advantageous because the angular aperture of the light beam can be adjusted after flush mounting of the lighting device in a wall or ceiling.

The position of the biconcave lens is preferably adjustable from a distance. The lighting device comprises a stepper motor and a wired or wireless interface suitable for operating the stepper motor. This is advantageous because no visible means are required on the second side of the plate to adjust the angular aperture of the light beam.

In one embodiment, the method comprises the additional step of setting a colour for the light beam.

The lighting device comprises an RGB LED, preferably an RGBW LED. The colour point of the light beam can be set by changing the ratios between the red, green and blue light emitted. By adding a white light, a greater light intensity can be obtained for the same power, to the detriment of colour saturation.

Alternatively, the lighting device comprises a first and a second white light source, wherein the first and second white light source have a different colour point and the colour point of the lighting device is set by changing the ratio of light output from the first and second white light source. The first and second white light sources are preferably LED. Preferably, the first and second white light sources are contained in a single chip package.

Setting the colour of the light beam is done using a wired or wireless interface.

In a third aspect, the invention relates to a method according to the second aspect, performed with a lighting device according to the first aspect.

In a fourth aspect, the invention relates to a lighting device according to the first aspect or a method according to the second aspect for architectural lighting.

Architectural lighting aims to accentuate an object in a space or part of a space by lighting with a specific colour, where the lighting device must be as invisible as possible so as not to disturb the architecture of the space and where the light source must be as invisible as possible to avoid glare. In addition, architectural lighting is in operation for a long time, so that the consumption of such lighting must be as limited as possible.

With a lighting device according to the first aspect and/or a method according to the second aspect, it is possible to sharply illuminate an object in a space or a part of a space by directing and adjusting the angular aperture of the light beam, wherein the lighting device is hidden behind a plate. The light source is almost not visible, which prevents glare as much as possible. The colour point of the light beam is adjustable. The construction of the light focusing system minimises internal losses, so that less power is required for the same light output.

In what follows, the invention is described by way of non-limiting examples or figures illustrating the invention, and which are not intended to and should not be interpreted as limiting the scope of the invention.

DETAILED DESCRIPTION OF THE FIGURES

FIG. 1—Prior art shows a schematic representation of a prior art lamp assembly.

The lamp assembly comprises an LED light source 2 mounted on a heat sink 6. The lamp assembly comprises an optical axis S, the optical axis S being the central optical axis of light emitted from the LED light source 2. The optical axis S is tilted by an angle β with respect to the axis V, the axis V passing through the aperture 8, substantially perpendicular to a plane comprising the aperture 8. The light emitted from the LED light source 2 is projected onto a first biconvex lens 3. Part of the light emitted from the LED light source 2 is projected next to the first biconvex lens 3, causing first internal light losses. Another part will be reflected by the first biconvex lens 3, which is a second source of internal light losses.

The biconvex lens 3 converges the emitted light in the direction of the axis S and projects the light onto a second biconvex lens 4. In FIG. 1, the LED light source 2 is in the focal point of the first biconvex lens 3, whereby the emitted light is projected onto the second biconvex lens 4 as a parallel beam.

The biconvex lens 3 is slidable along the V axis. Depending on the position, the emitted light is converged less or more and ultimately a light beam is obtained through the aperture 8 with a larger or smaller angular aperture α. With large convergence of the light beam through the first biconvex lens 3, it is possible that light rays cross the axis S and light is projected next to the second biconvex lens 4, which is a third source of internal light losses.

In FIG. 1, the focal point F' of the second biconvex lens is positioned in the aperture 8. The light beam is projected through the aperture 8 at an angular aperture α.

Figure 2:
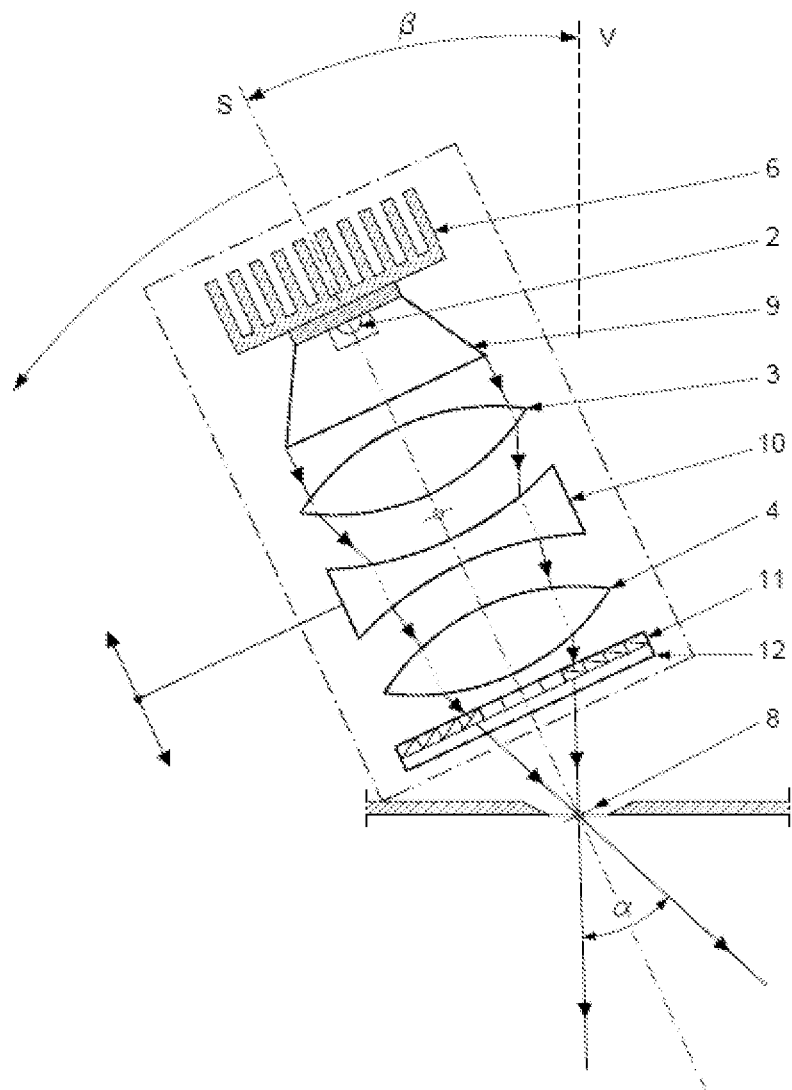
FIG. 2 shows a schematic representation of a lighting device according to an embodiment of the present invention.

FIG. 2 shows a schematic representation of a lighting device according to an embodiment of the present invention. The figure is not an exact or physically correct representation of a lighting device according to the present invention, but merely illustrates the operation.

The lighting device comprises an LED light source 2 mounted on a heat sink 6. The lighting device comprises an optical axis S, the optical axis S being the central optical axis of light emitted from the LED light source 2. The optical axis S is tilted with respect to an angle β with respect to the axis V, the axis V passing through the aperture 8, substantially perpendicular to a plane comprising the aperture 8. The lighting device comprises a light focusing system comprising a collimator 9, and first biconvex lens 3, biconcave lens 10, a second biconvex lens 4, and optional Fresnel lens 11 comprising a microstructure 12 for colour mixing.

The light emitted from the LED light source 2 is projected onto a collimator 9. The collimator 8 encapsulates the LED light source 2 and couples in all the light emitted by the LED light source 2. The collimator 9 completely projects the light as a parallel beam on a first biconvex lens 3. The biconvex lens 3 converges the light to the axis S. The light is incident on a biconcave lens 10. The biconcave lens 10 diverges the light away from the axis S. Due to the limited distance between the biconcave lens 10 and the second biconvex lens 4, the light is projected almost completely onto the second biconvex lens 4, minimising internal losses.

The biconcave lens 10 is movable along the axis S. As a result, there is more or less divergence away from the axis S, which increases or decreases the angular aperture α of the light beam.

The second biconvex lens 4 again converges the light to the axis S. The biconvex lens 4 is at a distance from the aperture 8 at least equal to one third and at most equal to the focal length of the second biconvex lens 4. As a result, most of the light is projected through the aperture 8, minimising the length of the light focusing system and the internal losses.

Optionally, the light focusing system comprises a Fresnel lens 11. The Fresnel lens 11 also converges the light to the axis S. The Fresnel lens 11 comprises a microstructure 12. The microstructure 12 is suitable for a good colour mixing of the emitted light, so that colour aberration is prevented.

Figure 3:
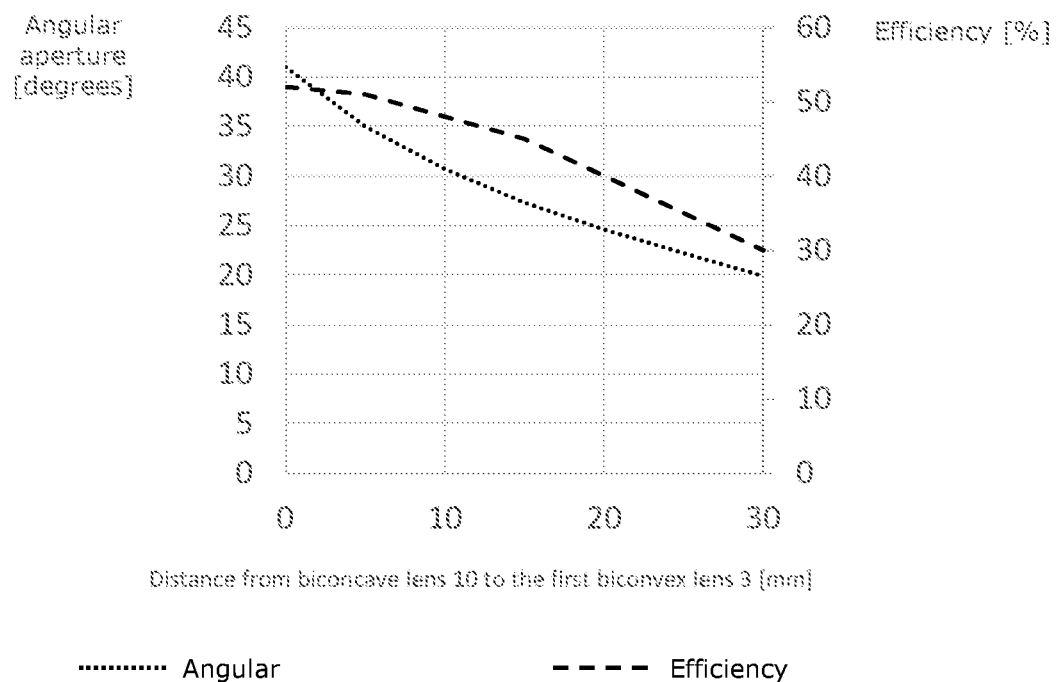
FIG. 3 shows a graphical representation of angular aperture and efficiency plotted against the position of the biconcave lens with respect to the first biconvex lens of a lighting device according to an embodiment of the present invention.

FIG. 3 shows a graphical representation of angular aperture and efficiency plotted against the position of the biconcave lens 10 with respect to the first biconvex lens 3 of a lighting device according to an embodiment of the present invention. The angular aperture is the angular aperture of the light beam projected through the aperture.

EXAMPLES

The invention will now be further explained on the basis of the following example, without however being limited to this.

Example 1

Example 1 concerns a prior art lamp assembly. The lamp assembly comprises an LED light source with a maximum power of 11 W. The aperture is circular with a diameter of 8 mm.

At maximum power of the LED light source and an angular aperture of 22° for the light beam, a light beam with a maximum luminous flux of 134 lm is obtained.

At maximum power of the LED light source and an angular aperture of 24° for the light beam, a light beam with a maximum luminous flux of 108 lm is obtained.

Example 2

Example 2 concerns a lighting device according to the present invention. The lighting device comprises an LED light source with a maximum power of 11 W. The aperture is circular with a diameter of 8 mm.

At maximum power of the LED light source and an angular aperture of 20° for the light beam, a light beam with a maximum luminous flux of 183 lm is obtained.

At maximum power of the LED light source and an angular aperture of 40° for the light beam, a light beam with a maximum luminous flux of 395 lm is obtained.

Example 3

Example 3 concerns a lighting device according to the present invention. The lighting device comprises an LED light source with a maximum power of 11 W. The aperture is circular with a diameter of 10 mm.

At maximum power of the LED light source and an angular aperture of 20° for the light beam, a light beam with a maximum luminous flux of 343 lm is obtained.

At maximum power of the LED light source and an angular aperture of 40° for the light beam, a light beam with a maximum luminous flux of 500 lm is obtained.

The invention claimed is:

1. A lighting device for the complete and precise projection of a light beam comprising a light source, a plate and a light focusing system, the plate comprising an aperture, the light source and the light focusing system being on a first side of the plate, the light source and the light focusing system being configured for projection of a light beam from the aperture, wherein the light focusing system comprises a collimator, at least two biconvex lenses and at least one biconcave lens, wherein when viewed from the light source to the aperture, the collimator, a first biconvex lens, the biconcave lens and a second biconvex lens are placed between the light source and the aperture on an axis S, the axis S being the central optical axis of emitted light from the light source, the focal length of both the first and second biconvex lenses being greater than or equal to the distance between the first and the second biconvex lens, wherein the absolute value of the focal length of the biconcave lens is greater than or equal to the distance between the first and second biconvex lens, with the second biconvex lens placed at a distance from the aperture that is at least equal to one third and at most equal to the focal length of the second biconvex lens, the collimator having a diameter such that the collimator is configured to receive all of the light emitted from the light source and the diameter of the two biconvex lenses and the biconcave lens being at least equal to the diameter of the collimator.

2. The lighting device according to claim 1, wherein the light source is an LED.

3. The lighting device according to claim 1, wherein the aperture in the plate is a circular opening with a diameter of at least 6 mm and at most 12 mm.

4. The lighting device according to claim 1, wherein the light focusing system comprises a Fresnel lens, comprising a microstructure for colour mixing, wherein the Fresnel lens is placed between the second biconvex lens and the aperture on the axis S.

5. The lighting device according to claim 1, wherein the biconcave lens is movable on the axis S between the first and the second biconvex lens.

6. The lighting device according to claim 1, wherein the lighting device comprises a tilt and rotation system for controlling the tilting and rotation of the axis S of the lighting device with respect to an axis V located through the aperture substantially perpendicular on the plane of the plate.

7. The lighting device according to claim 1, wherein the lighting device can be tilted by 30° with respect to the axis V and is rotatable by 360°.

8. The lighting device according to claim 6, wherein the tilt and rotation system can be operated remotely.

9. The lighting device according to claim 1, wherein the lighting device has an installation height of at most 120 mm and an installation diameter of at most 130 mm.

10. The lighting device according to claim 1, wherein the lighting device is used for architectural lighting.

11. A method for completely and precisely illuminating an object or space through an aperture comprising
providing a lighting device, comprising a light source, a plate having an aperture and a light focusing system, placing the lighting device and illuminating using a light beam, wherein the light beam is projected from the aperture,
wherein the light focusing system comprises a collimator, at least two biconvex lenses and at least one biconcave lens,
wherein when viewed from the light source to the aperture, the collimator, a first biconvex lens, the biconcave lens and a second biconvex lens are placed between the light source and the aperture on an axis S, the axis S being the central optical axis of emitted light from the light source, the focal length of both the first and second biconvex lenses being greater than or equal to the distance between the first and the second biconvex lens,
wherein the absolute value of the focal length of the biconcave lens is greater than or equal to the distance between the first and second biconvex lens, with the second biconvex lens placed at a distance from the aperture that is at least equal to one third and at most equal to the focal length of the second biconvex lens, wherein the collimator has a diameter such that all the light emitted from the light source is collected and wherein the diameter of the two biconvex lenses and the biconcave lens is at least equal to the diameter of the collimator.

12. The method according to claim 11, wherein the method comprises the additional step of directing the light beam.

13. The method according to claim 11, wherein the method comprises the additional step of adjusting the angular aperture of the light beam, wherein the angular aperture of the light beam is determined by the position of the biconcave lens with respect to the first and second biconvex lenses.

14. The method according to claim 11, wherein the method comprises the additional step of setting a colour for the light beam by changing the ratios between red, green and blue light output at an RGB LED, or by changing the ratio of light output from a first and a second white light source, the first and second white light source having a different colour point.

15. The method according to claim 11, performed with a lighting device for the complete and precise projection of a light beam comprising a light source, a plate and a light focusing system,
the plate comprising an aperture, the light source and the light focusing system being on a first side of the plate, the light source and the light focusing system being configured for projection of a light beam from the aperture,
wherein the light focusing system comprises a collimator, at least two biconvex lenses and at least one biconcave lens,
wherein when viewed from the light source to the aperture, the collimator, a first biconvex lens, the biconcave lens and a second biconvex lens are placed between the light source and the aperture on an axis S, the axis S being the central optical axis of emitted light from the light source, the focal length of both the first and second biconvex lenses being greater than or equal to the distance between the first and the second biconvex lens,
wherein the absolute value of the focal length of the biconcave lens is greater than or equal to the distance between the first and second biconvex lens, with the second biconvex lens placed at a distance from the aperture that is at least equal to one third and at most equal to the focal length of the second biconvex lens, the collimator having a diameter such that the collimator is configured to receive all of the light emitted from the light source and the diameter of the two biconvex lenses and the biconcave lens being at least equal to the diameter of the collimator.

16. The method according to claim 11, wherein the method is used for architectural lighting.

* * * * *